US009038041B2

(12) United States Patent
Salz et al.

(10) Patent No.: US 9,038,041 B2
(45) Date of Patent: May 19, 2015

(54) STREAM PROCESSOR WITH COMPILED PROGRAMS

(75) Inventors: Jonathan Salz, San Francisco, CA (US); Richard S. Tibbetts, Arlington, MA (US)

(73) Assignee: TIBCO Software, Inc., Palo Alto, CA (US)

( * ) Notice: Subject to any disclaimer, the term of this patent is extended or adjusted under 35 U.S.C. 154(b) by 1280 days.

(21) Appl. No.: 11/644,189

(22) Filed: Dec. 22, 2006

(65) Prior Publication Data

US 2008/0134158 A1    Jun. 5, 2008

Related U.S. Application Data

(60) Provisional application No. 60/873,006, filed on Dec. 4, 2006.

(51) Int. Cl.
  *G06F 9/44* (2006.01)
  *G06F 9/45* (2006.01)

(52) U.S. Cl.
  CPC ... *G06F 8/34* (2013.01); *G06F 8/41* (2013.01)

(58) Field of Classification Search
  None
  See application file for complete search history.

(56) References Cited

U.S. PATENT DOCUMENTS

| 7,010,538 | B1 | 3/2006 | Black |
| 7,509,244 | B1* | 3/2009 | Shakeri et al. ............... 703/7 |
| 2005/0257195 | A1* | 11/2005 | Morrow et al. ............. 717/109 |
| 2006/0005178 | A1 | 1/2006 | Kilgard et al. |
| 2007/0256054 | A1* | 11/2007 | Byrne et al. ................ 717/113 |

OTHER PUBLICATIONS

Konstantinos Konstantindes, "The Khoros Software Development Environment for Image and Signal Processing", May 1994, IEEE Transactions on Image Processing, vol. 3, pp. 243-252.*
Abadi et al., "Aurora: a new model and architecture for data stream management," *The International Journal on Very Large Data Bases* 12.2:120-139 (2003).
Balakrishnan et al., "Retrospective on aurora,", *The International Journal on Very Large Data Bases* 13.4:370-383 (2004).
Carney et al., "Monitoring streams: a new class of data management applications," *Proc. 28th International Conference on Very Large Data bases* Hong Kong, China, 2002, VLDB Endowment 215-226.
Cherniack et al., "Scalable distributed stream processing," *Proc. Conference on Innovative Data Systems Research* (2003).

(Continued)

*Primary Examiner* — Lewis A Bullock, Jr.
*Assistant Examiner* — Mark Gooray
(74) *Attorney, Agent, or Firm* — Wolf, Greenfield & Sacks, P.C.

(57) ABSTRACT

A stream processing platform that provides fast execution of stream processing applications within a safe runtime environment. The platform includes a stream compiler that converts a representation of a stream processing application into executable program modules for a safe environment. The platform allows users to specify aspects of the program that contribute to generation of modules that execute as intended. A user may specify aspects to control a type of implementation for loops, order of execution for parallel paths, whether multiple instances of an operation can be performed in parallel or whether certain operations should be executed in separate threads. In addition, the stream compiler may generate executable modules in a way that cause a safe runtime environment to allocate memory or otherwise operate efficiently.

10 Claims, 14 Drawing Sheets

(56) References Cited

OTHER PUBLICATIONS

Shah et al., "Highly available, fault-tolerant, parallel dataflows," *Proc. 2004 ACM SIGMOD International Conference on Management of Data (SIGMOD '04)*, ACM, New York, New York, USA, 827-838 (2004).

Spinellis, D., "Unix tools as visual programming components in a GUI-builder environment," *Software—Practice and Experience* 32(1):57-71, Jan. 2002.

\* cited by examiner

STREAM PROCESSOR WITH COMPILED PROGRAMS

RELATED APPLICATIONS

This application claims priority under 35 U.S.C. §119(e) to U.S. Provisional Application Ser. No. 60/873,006, entitled "STREAM PROCESSOR WITH COMPILED PROGRAMS," filed on Dec. 4, 2006, which is herein incorporated by reference in its entirety.

BACKGROUND OF THE INVENTION

In today's information-rich environment, quickly handling massive volumes of data can be both challenging and important. This data may be provided in streams, with, in many instances, data values being generated in real-time, as events occur. For example, microsensors used in radio-frequency identification (RFID) in tracking and access applications can provide streaming data on locations of objects being tracked. As another example, data defining financial transactions may be provided in a stream as those transactions occur.

For many businesses the ability to operate on streaming data arriving in real-time can provide significant competitive advantage. For example, financial operations that are based on results of financial trades may receive streams of data on trades as they occur. Moreover, responding to particular signals in the streaming data quickly is often a critical aspect of many applications. As an example, network monitoring systems used by government agencies to detect security threats need to detect and report events represented in streams of data collected through monitoring.

Conventionally, processing on streaming data was performed by first storing the data in a database. The database could then be queried to retrieve the data for further processing. Therefore, analyzing the data in real-time was difficult, because of the limits imposed by database access time, particularly for streams with high data rates.

Event stream processing (ESP) is an emerging technology that enables a stream of data to be processed in real-time. Events, manifested as meaningful patterns within the data streams, are detected as a result of the stream processing. ESP provides complex event processing, which allows meaningful complex events to be detected in continuously arriving data or in a combination of stored and newly arriving data. An organization using ESP can monitor streams of data, analyze them, and respond properly to opportunities and threats.

An event processing engine constitutes a core of the event processing system and is designed to provide real-time data processing performance by eliminating the latencies characteristic of conventional approaches of storing and retrieving streams of data for later processing. In an event processing engine, the streaming data "runs through" queries, or operators, that act upon the data.

ESP technology has been applied in a commercially available stream processing platform provided by StreamBase, Inc, Lexington, Mass., U.S.A. and improved to develop a StreamBase Stream Processing Platform, the first of a new class of systems that provides the ability to process, analyze, and act on streaming information. The stream processing platform can be used to develop and execute stream processing applications that define the processing to be performed on one or more streams in any desired setting.

Despite a good performance achieved by existing stream processing platforms, improvements would be desirable.

SUMMARY OF THE INVENTION

In one aspect, the invention relates to a method of generating machine-executable instructions for processing a stream of values. The method comprises receiving a representation of processing to be performed on at least one input stream to produce at least one output stream. The representation may included a plurality of operators and data flow between the operators. The representation may be compiled into machine-executable instructions that, when executed, perform operations on a value of an input data stream of the at least one input stream, the operations being defined by the plurality of operators being executed to completion in accordance with the data flow.

In another aspect, the invention relates to a computer-readable medium comprising computer program modules that, when executed, perform a method of generating machine-executable instructions from user-specified instructions. The machine-executable instructions execute in a safe runtime environment that represents objects of a complex type using a header and represents primitive types without a header in a heap. The user specified instructions may reference at least one object of a complex data type having a plurality of elements. According to the method machine-executable instructions that cause the safe runtime environment to allocate a storage object identified with a header are generated. Machine-executable instructions in which values for the elements of the at least one object are accessed in a portion of the storage object using values of objects of a primitive type are also generated.

In another aspect, the invention relates to a method of operating a data processing device processing a stream of data, the stream comprising a plurality of successive values, each value having a plurality of elements associated therewith. According to the method the successive values in the stream are queued in a plurality of queues formed in a machine-readable medium. Each queue of the plurality of queues stores, for each of the successive values, an element of the plurality of elements.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
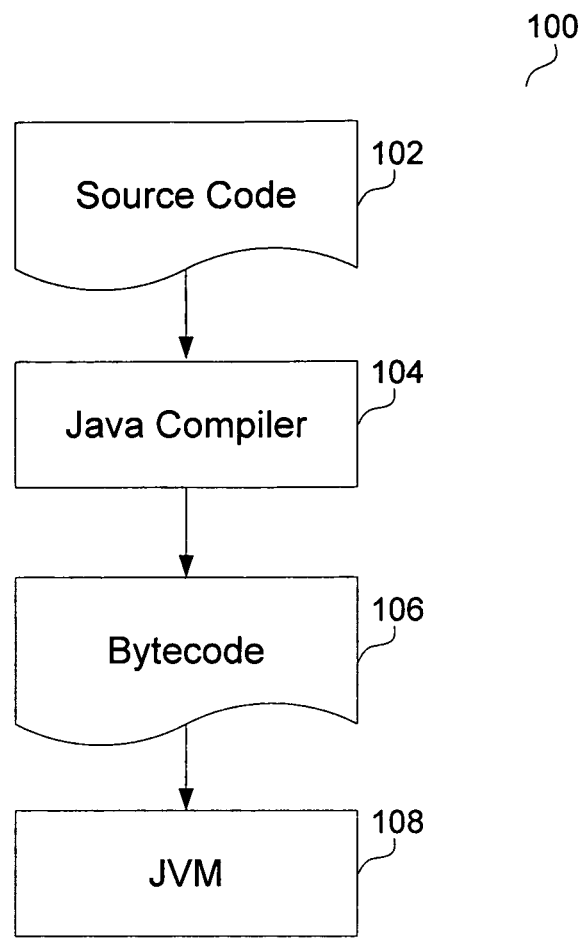
FIG. 1A is a block diagram of a prior art process of creating code for execution within a runtime environment.

An improved stream processing platform according to embodiments of the invention provides fast and/or safe execution of stream processing applications. Such a stream processing platform may include a stream compiler that prepares a stream processing application for fast execution in a safe run-time environment using constructs desirable for stream processing.

According to some embodiments of the invention, a stream processing platform includes an integrated developer environment (IDE) and a server. Within the IDE, a user may develop a stream processing application in a stream processing programming language. The application may then be converted to executable instructions. In some embodiments, a stream compiler first converts the stream processing application into source code in a general purpose language. A standard compiler for that general purpose language may then compile that source code into an executable representation. The executable representation may then be executed within a safe environment on the server. However, any suitable mechanism may be used to develop and execute stream processing applications.

The stream compiler may support features that provide fast execution of stream processing applications. Moreover, some executable representations can be executed in a safe environment. For example, the source code generated by the stream compiler may be executed in a single, possibly multi-threaded, process, with the number of threads being specified by the user when developing the application. The compiler may support constructs that allow a user to specify the order of execution of operations within the application, even if flow of data through the application could follow one of multiple paths. Moreover, constructs are available to specify that certain operations be performed in a separate thread or that multiple instances of the same operations be implemented in the executable code. In scenarios in which a stream processing application is implemented in multiple threads, faster execution also may be facilitated by using coding constructs that reduce the amount of time that locks on queues between threads are in place.

Another feature that may be implemented in a stream compiler may allow a user developing an application to specify that a loop written in the stream processing language be implemented in the executable code as either a recursive loop or a non-recursive loop. User may select a loop type that provides better execution characteristics, such as executing more quickly or using less memory.

To allow efficient stream processing within a safe environment or other environment with heap allocation and/or garbage collection, the compiler may implement variables of complex data types in a fashion that requires less memory allocation than in typical implementations.

All of the foregoing and other features may all be provided in one stream compiler, though embodiments may be constructed with only a single of these features or any combination of them. Moreover, though features are described for incorporation in a stream compiler, such features may be used in the creation of stream processing applications in other ways or may be implemented in platforms that process data represented in ways other than as streams.

A stream processing platform according to embodiments of the invention may be implemented in any suitable way. In the embodiments described herein, the stream processing platform is implemented using a Java® Virtual Machine (JVM). However, Microsoft®.NET® Common Language Runtime (CLR), as another example, may be used.

Referring to FIG. 1A, a block diagram of a prior art compilation process 100 is shown. The compilation process 100 starts with source code 102 which can be generated using a text editor or an integrated development environment. Because FIG. 1A illustrates compilation of Java® code, the source code 102 is Java® source code, though compilers exist for other high-level programming languages. A Java® compiler 104, for example, the javac, translates, or compiles, the source code 102 into bytecode 106, which is commonly referred to as "class files." The bytecode contains instructions to a Java® Virtual Machine (JVM) 108. Bytecode 106 contains computer-executable instructions in a platform-independent format which JVM 108 then executes by interaction with the underlying platform on which it operates.

JVM 108 is implemented as part of a runtime environment and is configured to operate on a specific platform. The JVM 108 interprets bytecode 106 into platform-specific instructions and executes the instructions. Though, in some embodiments, a JVM may dynamically compile, recompile, or partially compile the bytecode into machine code, or into any other representation more efficient than the original bytecode.

A JVM provides a security model, sometimes referred to as a "sandbox," which defines the boundaries within which a Java® program is allowed to operate. The Java® program constrained within the sandbox, generally, is permitted to access the memory of a host computer only in a safe, structured way, and can be limited in the types of instructions or program modules that can be executed. This protects the host computer from potentially harmful downloaded code, thus safely executing the code in a way that cannot interfere with other operations that may be performed by the platform.

In embodiments of the invention, Java® is used because, apart from having other useful characteristics, it is a highly portable, object-oriented and strongly typed programming language. Java® also provides built-in threading capabilities for ease in development of multitasking systems. However, it should be understood that embodiments presented herein can be implemented using other programming languages.

Figure 2:
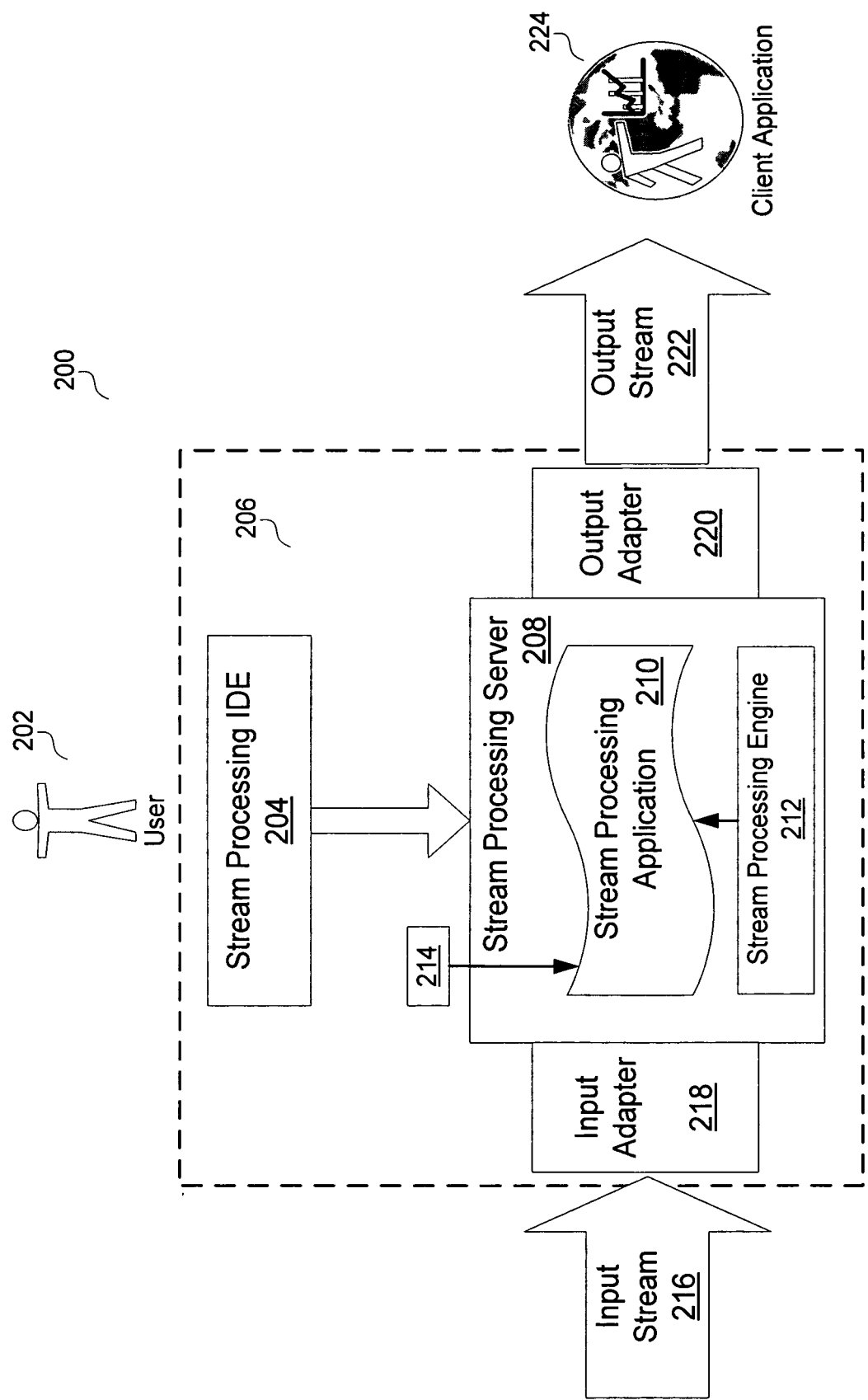
FIG. 2 is a block diagram of a stream processing platform according to an embodiment of the invention.

FIG. 2 shows a stream processing platform 200 according to an embodiment of the present invention. In embodiments of the invention, the platform may be implemented by programming on one or more data processing devices. Accordingly, the platform can be implemented as computer-readable instructions (e.g., data structures, computer-executable instructions, programs, program modules, etc.) embodied in one or more computer-readable storage media. The implementation may employ one or more tools useful for developing and executing stream processing applications. Those tools may be coded as custom tools or, in some embodiments, may be commercially available tools.

In embodiments of the invention, stream processing platform 200 may include a stream processing integrated developer environment (IDE) 204 and a stream processing server 208. A user 202 can interact with the IDE 204 through a graphical user interface or any other suitable mechanism to design a stream processing application 210. Such a graphical user interface may provide a mechanism that allows user 202 to specify operators constituting the application and a "flow" of data between the operators. The IDE 204 may contain tools that allow user 202 to define and/or modify operators, define and/or modify flow of data between operators and/or specify other parameters related to the manner in which stream processing application 210 executes. However, it is not necessary that a stream processing application be specified graphically. As an example of alternative mechanisms for defining a stream processing application, user 202 may use a series of statements in a text document or may specify values according to a schema that indicates operations to be performed and a processing sequence.

In the embodiment illustrated, IDE 204 and stream processing server 208 are constrained within a sandbox 206. Sandbox 206 may be provided by executing the software that implements stream processing platform 200 on a platform that provides safe execution, or in any other suitable way. Sandbox 206 may restrict access to memory and other processing resources and can also restrict the operations performed by stream processing application 210 as it executes. Restrictions imposed by sandbox 206 can block malicious or harmful code from executing. In this way, a stream processing application may run on a server or within a system with other applications without, either intentionally or unintentionally, disrupting those applications.

Though it is not necessary for stream processing platform 200 to execute within sandbox 206, doing so facilitates the incorporation of function plug-ins 214. Function plug-ins 214 may allow a user to extend the functionality of stream processing platform 200 by programming it to perform functions that it was not initially programmed to perform. In the embodiment illustrated, the extension functions provided by plug-ins 214 may relate to operators that are incorporated into a stream processing application, though plug-ins may be used to provide any suitable extension functions. Plug-ins 214 may be developed by user 202 or may be acquired from a third party or any other suitable source. Sandbox 206 allows "safe" execution of plug-ins because it can block the plug-ins from executing any malicious or unintentionally harmful coding. In embodiments in which stream processing platform 200 is implemented with software written in the JAVA® programming language, plug-ins 214 may be implemented as JAVA® modules. The modules may execute processing for an operator that may be incorporated in a stream processing application. However, any suitable mechanism may be used to implement plug-ins 214.

Regardless of how it is developed, stream processing application 210 is executed within stream processing server 208. Stream processing engine 212, within stream processing server 208, may execute stream processing application 210. To prepare stream processing application 210 for execution, it may be compiled. In the embodiment illustrated, compiling the stream processing application produces a series of computer executable instructions that encode the operators and flow specifying the stream processing application. These computer-executable instruction may be formatted for execution by a physical or virtual machine or in any other suitable way.

During execution, stream processing engine 212 may apply data values from one or more input streams 216 to stream processing application 210. Stream processing engine 212 may also perform other functions associated with execution of stream processing application, such as configuring the machine on which the application executes to create processes or threads for execution of portions of the stream processing application. In addition, stream processing engine 212 may manage persistent and non-persistent storage, as well as a hierarchy of storage, with some data located in memory and other data located on a disk or in other suitable storage locations.

A stream may be provided to the application in real-time. For example, the input data stream 216 may be raw data collected from sensors, provided to the stream processing application as it is collected. However, data in a stream may be collected and/or processed before it is applied to the stream processing application. For example, some or all of the data input to stream processing application 210 may be retrieved from data tables or other suitable source.

Any suitable representation of a stream may be used. In the embodiment illustrated, each stream is a series of values. Each value may be represented as a tuple, such that each value contains multiple elements. The elements may be represented with a name-value pair to facilitate reference to the individual elements as a stream is processed. However, any suitable representation of a data element may be used. For each data stream, a schema may be specified. The schema may specify at least one field characterized by a type and size as a way to define the elements of the values of the stream. Though, in some embodiments, tuples on streams may also have schemas with no fields, in which case the tuples denote empty events.

Data sources may provide streams of data in a format different from the one processed by a stream processing application. Adapters 218 and 220 may be provided that interface with sources of data external to the stream processing application. The adapters, which may be configurable, can be embedded within the stream processing platform or supplied externally. The input adapter 218 may convert streaming data from an external source (such as, for example, a market feed) into a format required by the stream processing engine. The output data stream may be converted by the output adapter 220 into a format required by a client application 224.

Within stream processing server 208, stream processing application may process data in the input data streams and generate a result, which may be one or more output data streams 222. In some embodiments, input stream 216 may have no defined end and may be potentially infinite. Accordingly, processing by stream processing application 210 may be performed "on-the-fly," meaning that data values are processed at a rate at which they are input to the stream processing application. Such processing may be performed in real time as the values are generated. In other scenarios, stream processing application 210 may operate on "windows," each representing only a portion of data in an input data stream. Processing performed on windows may be performed on-the-fly and may be performed in real time. However, the amount and timing of processing is not a limitation on the invention.

Regardless of how the processing is performed, processed output data stream 218 may be used in any suitable way. For example, it may be supplied, possibly through adapters, to client application 224. It should be appreciated that both input and output data streams can comprise multiple streams, where the number of input data streams can be different from the number of output data streams processed within an application. In addition, it should be understood that processed output data may be substantially different from the input data. For example, input and output streams may have different schemas, have values generated at different rates, or otherwise have differing characteristics, depending on the specific types and purposes of data to be processed and the programming of the stream processing application. Stream processing engine 212 may offer overload handling capabilities, which, in situations when a rate of arriving tuples exceeds the system's capacity, may provide efficient load shedding.

Figure 3:
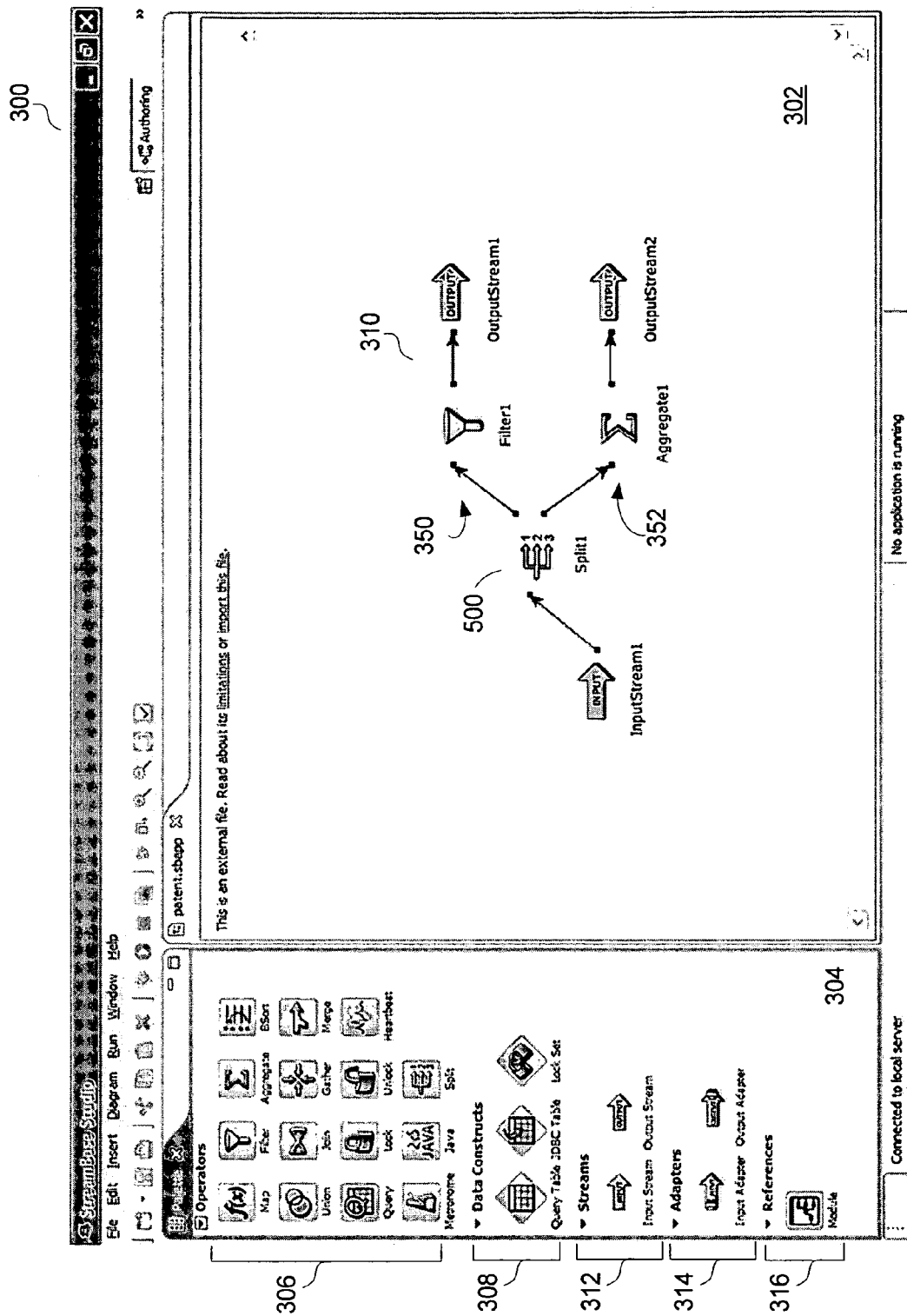
FIG. 3 is a sketch of a graphical user interface through which an application for execution on a stream processing platform may be specified according to an embodiment of the invention.

IDE 204 may provide a facility for a user 202 to specify a stream processing application. FIG. 3 is a sketch of a graphical user interface 300 provided by the IDE 204 according to an embodiment of the invention. In the embodiment illustrated, user 202 can design applications by visually assembling an application diagram 310 that specifies a work flow within the application. IDE 204 may implement graphical interface 300 using known programming constructs for graphical user interfaces, including those provided by a platform on which IDE 204 executes. However, graphical user interface 300 may be implemented in any suitable way.

In the embodiment illustrated, graphical interface 300 provides a drawing canvas 302 onto which components can be "dragged and dropped" from a palette 304 to specify a stream processing application. In the embodiment illustrated, palette 304 contains sections, including operator section 306, data construct section 308, stream section 312, adapter section 314, and reference section 316, with each section containing icons representing a different type of operator. Segmenting the icons by type of operation performed may facilitate user interaction, but is not critical to the invention.

Once placed on the canvas, the icons can be connected by arcs in order to indicate the sequence in which the stream processing engine may process the streaming data. The arcs indicate that streams output by one component are input streams to another component. In essence, each arc represents an intermediate stream.

Some of the operators that may be provided for inclusion in a stream processing application are shown included in operator section 306. For example, the operators may include data manipulation operators, such "Map," "Filter," "Aggregate," "Split," "Join," "Union," "BSort," "Merge," "Gather," "Query," "Lock," "Unlock," "Heartbeat," "Metronome," and "Java." Operators may have one or more input ports and one or more output ports. Operator section 306 contains operators that may be used in defining a stream processing application and may provide the capability to filter a stream or to merge, combine or correlate multiple streams. Operators may also perform computations on real-time streams or stored data. As a specific example, the "Map" operator applies an expression to a single input data stream to generate a single output data stream. The "Filter" operator also accepts a single input data stream and applies one or more predicates (tests) to the values of the stream and produces an output stream containing only those values matching the predicates. The "Union" operator accepts two or more input data streams and produces one output data stream containing values from either input stream in the order they arrived. The "Split" operator, which will be discussed in detail below in connection with FIGS. 5A and 5B, receives a stream as an input and outputs multiple streams. This operator explicitly controls the order in which downstream components are to be processed.

Further, the "Aggregate" operator is used to compute values based on data values in a window of a stream. The "Join" operator produces an output stream in which each value contains elements derived from values of two input data streams that match a test condition. The "BSort" operator performs an approximate sort of an input data stream and may be used when the input data stream is anticipated to be slightly out of order.

The "Merge" operator compares data values in two input data streams having tuples with matching schemas (i.e., with the same number of fields, data types and sizes), using an expression that specifies a field to sort on. It then combines the input data, emitting an ordered output data stream that also has the same schema as the input streams. The "Gather" operator receives input from two or more streams and concatenates data values that share a key value. The "Gather" operator is often used when a tuple needs to be copied into multiple branches of an application, and then rejoined later on for further processing. The "Gather" operator may also be used to detect patterns in multiple input data streams.

Operators may also be provided to perform data even if not formatted as a stream. The "Query" operator may be employed to read data from, write data to, or delete data from, a "Query Table" data construct or a JDBC data source. The "Query" operator accepts data from both its associated table and one input stream in the application and, after processing the data from these sources, emits required output fields. The "Query Table" containers store tuple values outside of a stream and may be used for sharing data and maintaining state within the stream processing application. The "JDBC Table" is a data construct that enables a stream processing application diagram to share data from an external, persistent JDBC data source.

Operators such as "Metronome" and "Heartbeat" operators may be included to provide timing mechanisms when processing streams by the application. The "Metronome" is an operator that delivers output values in a stream periodically, based on the system clock, at a user specified interval, thus controlling the timing of downstream operations. It can be used, for example, when a consumer of an output stream is unable to keep up with the speed that data enters into, and is processed by, the stream processing engine. The "Metronome" operator does not receive any input tuples and has one output port. The purpose of the "Heartbeat" operator is to add timer tuples to the input stream being processed, generally so that downstream operations can occur even if there is a lull in the incoming data. The "Heartbeat" operator can detect late or missing tuples.

The "Lock" and "Unlock" operators work together to provide exclusive access to data so that, in a multithreaded application, that section may be accessed by one thread at a time. The collections of locks that are used together by the "Lock" and "Unlock" operators are encapsulated by a "Lock Sets" data construct.

In the embodiment illustrated, icons within operators section 306 are supplied as part of the stream processing application. A stream processing platform may support definition of other operators. Module section 316 may contain icons for modules that have been defined as another application. Each such module may perform operations defined and can be incorporated into a stream process application by inserting a "Module" icon into the application diagram. In this way, components for inclusion in a stream processing application can be defined by a user. For example, the "Java" operator can be used to create custom Java® operators. However, it should be understood that custom functions written using other programming languages can be utilized as well.

An "Input Streams" construct operates to define an entry point into a stream processing application and declares the starting schema of the inbound data. Similarly, the "Output Stream" specifies an exit point from the stream processing application and declares the schema of the outbound data. An application diagram may contain one or more "Input Stream" and "Output Stream" streams. The input and output data streams can be modified through adapters, which can be specified by adding "Input Adapter" and "Output Adapter" adapters to the application.

In embodiments of the invention, operators, data constructs and other components may be used to define an application diagram. To facilitate testing and debugging of the created application, the IDE 214 includes tools that may be used by a user. For example, the above-described components may be "typechecked," allowing tools to use type checking to verify that components specifying an application diagram are interconnected in a proper fashion. Additionally, IDE 214 may include a built-in load simulator that assists in testing, and a debugger. In addition, a performance monitor may provide information on the speed of the running application. These tools may be provided by configuring tools supplied as part of the stream processing platform or provided as plug-ins.

Once a stream processing application is specified, it may then be executed. Traditionally, stream processing applications have been interpreted. Heretofore, stream processing applications have been executed by executing functions associated with the objects using data supplied in an input stream. A scheduler controlled the time at which each object was executed.

Figure 1B:
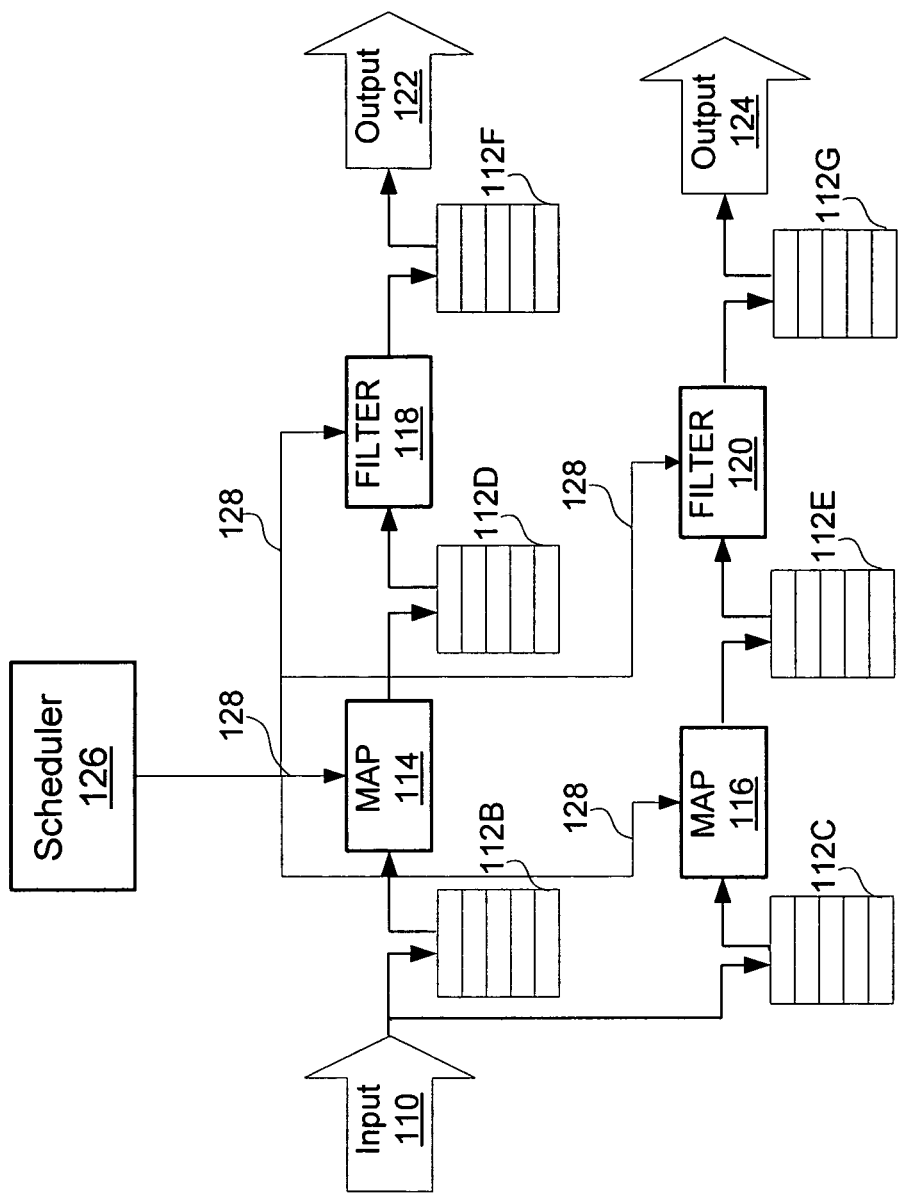
FIG. 1B is a schematic diagram of a prior art for runtime environment for a stream processing program.

FIG. 1B is a schematic diagram illustrating such a prior art process. In the example illustrated, data values arriving in input stream 110 are queued for processing. Therefore, a queue is created for the input of each operator. FIG. 1B shows that for an application diagram composed of Input 110, Outputs 122 and 124, Maps 114 and 116, and Filters 118 and 120 queues 112A-112G are created. In the example of FIG. 1B, each of the operators was implemented as a program module written in the C++ programming language.

Interconnections 138 between scheduler 126 and each of the functional modules allow scheduler to control execution of the application. In operation, scheduler 126 selects an operator with data in its queue and executes that operator on one or more of the data values. As a result, scheduler 126 determines which operator is executed and the number of data values executed in a batch.

The output values generated by execution of each operator are queued at the input of the next operator in an application diagram in accordance with the data flow specified in that diagram. Scheduler 126 then chooses another operator to be executed.

According to an embodiment of the invention, an improved stream processing application can be constructed by avoiding the need to queue data between modules. Processing may be significantly improved by a development tool that produces a set of computer-executable instructions that can be executed quickly on a machine, whether a virtual or physical machine. Such a tool is referred to herein as a "stream compiler." A stream compiler may convert a stream processing application, specified as multiple operators and data flow between those operators, into a series of computer-executable instructions that, when executed, processes a value from an input stream. The executable object produced in this way may be accessed repeatedly in the stream processing runtime environment to process each input data value in a stream. Alternatively or additionally, multiple instances of each object may be created and accessed simultaneously. Though state information may be saved as part of execution of a stream processing application, data need not be queued between operators.

Figure 4:
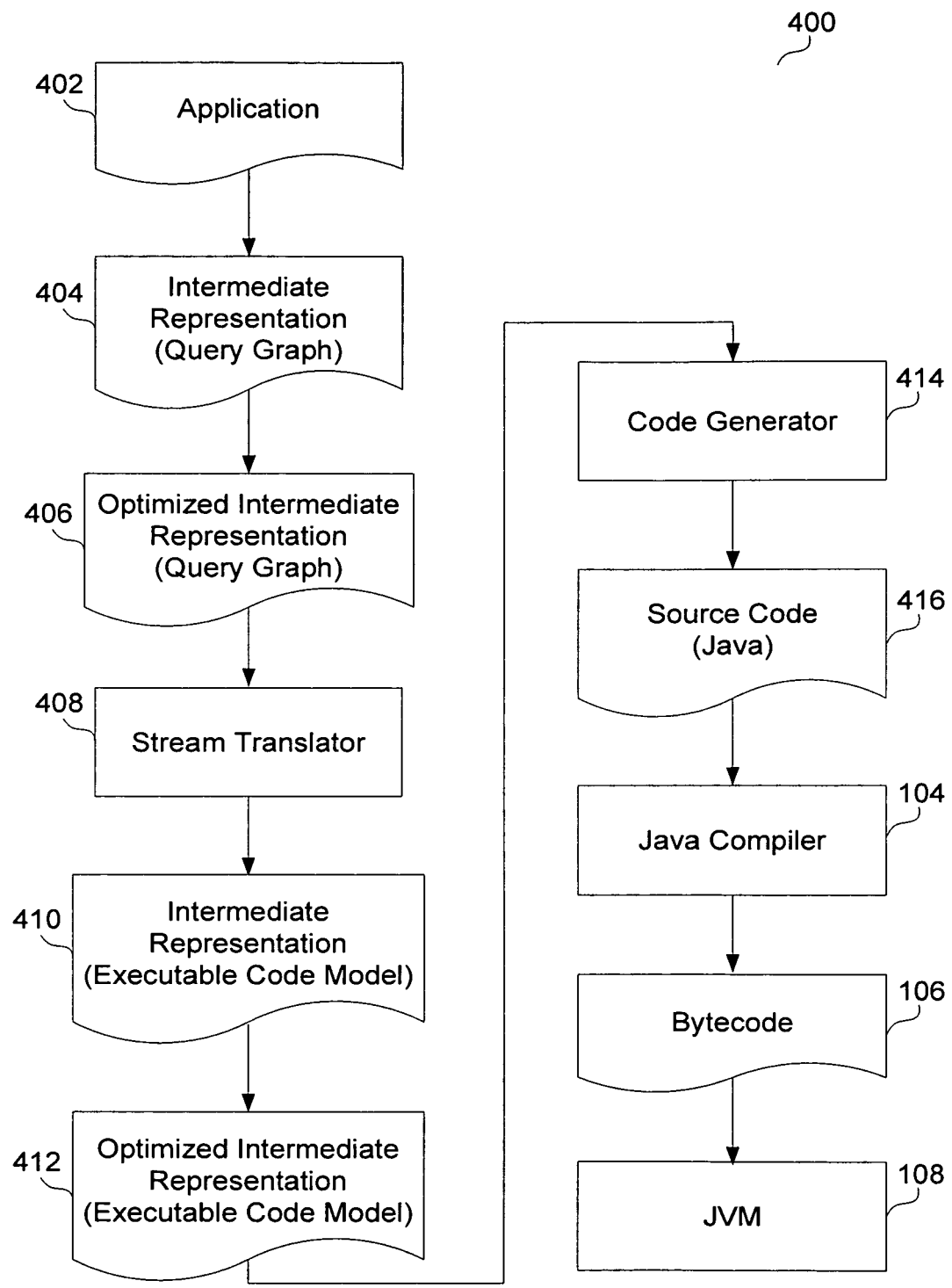
FIG. 4 is a block diagram of a process of creating code for execution within a stream processing platform according to an embodiment of the invention.

FIG. 4 is a block diagram of a process 400 of operating a stream compiler according to an embodiment of the invention. In the example shown, the process begins with generation of an application 402. The application may be generated in any suitable way, such as using an application diagram created by a user on a drawing canvas of a graphical user interface such as is shown in FIG. 3. Though, a text-based representation of an application program may be used. For example, a programming language could be provided to allow a text representation of the work flow within the application. As a specific example, a StreamSQL language could be defined as a superset of a structured query language (SQL), with extensions for creating streams, defining windows over the streams, correlating data from different streams, coping with out-of-order data, and integrating streaming data with stored tables.

The application program is then converted into an intermediate representation 404 comprising a query graph. The intermediate representation may be stored in any suitable form that defines operators and data flow between those operators that occurs when application 402 is executed. This representation may be formed by parsing the information provided to define application 402. Type checking and other operations may be performed as the intermediate representation 404 is formed. The intermediate representation 404 may be generated in any suitable format. In the embodiment illustrated, intermediate representation 404 is an XML file. Though, as another example, intermediate representation 404 may be a parsed tree of function calls stored in any other format. Each function call may correspond to an operator in the application 402. The intermediate representation 404 may be optimized by the stream compiler to generate an optimized intermediate representation 406 which is characterized by advantageous features, e.g., those that may improve performance and memory utilization.

The optimized intermediate representation 406 may be converted by a stream translator 408 into an intermediate representation 410 comprising executable code model, which may be optimized to provide an optimized intermediate representation 412. The optimization may provide traditional compiler optimization as well as optimization specific for stream processing.

A code generator 414 of the stream compiler may convert the optimized intermediate representation 412 into source code 416. In this embodiment, source code 416 is in a known programming language, allowing known programming tools to be used to develop and execute the resulting program. As a specific example, code generator 414 converts the optimized intermediate representation 412 into JAVA® source code. Though, in some embodiments, other known programming languages may be used or a stream compiler may generate machine-executable instructions without an intermediate step of representing the stream processing application in a known source language.

Code generator 414 may operate in any suitable way. In some embodiments, each operator that may be included in a stream processing application may be associated with a corresponding code generator, which creates code for the operator. Such code generators may operate, for example, by providing source level code for each function performed by an operator when a data value from an input stream is applied to that operator. In embodiments in which the source code is Java® source code, an object model for the Java® source code may be generated, which contains class and function declarations.

To ensure that the resulting application executes quickly as intended or otherwise has desirable attributes, code generator 414 may employ techniques that, for example, specify efficient data representations or memory allocation or controls efficient multi-threading. Code generator 414 may apply these techniques in any suitable scenario or may apply them in response to user input specified as part of defining application 402.

In the embodiment illustrated, source code 416 is in a known language and can be prepared for execution using tools associated with the known language. In the embodiment illustrated in which JAVA® source code is used, source code 416 is translated into bytecode 106 by the Java® compiler 104. The bytecode 106 is then loaded and executed by the JVM 108. In embodiments in which other known source languages are used, tools appropriate for those languages may be used. In other embodiments in which the stream processing application is not first converted into a known source language, tools may be used that convert the translated stream processing application directly to machine-executable instructions.

Regardless of how the machine-executable instructions are formed, the order of execution of those instructions is deterministic and the application is executed as one (possibly multi-threaded) process. Each input data value may be processed as a call to a module containing these machine-executable instructions. Therefore, a concurrent model of execution replaces the prior art batch model.

In order to realize the concurrent model, a technique may be provided for generating code which ensures a deterministic order of execution of operators, even if the flow specified with a stream processing application includes multiple paths. The method may be realized by a "Split" operator that may be incorporated into a stream processing application. For example, canvas 302 (FIG. 3) shows a stream processing application with a path 350 and a path 352. In some scenarios, it may be desirable to specify whether processing within path 350 or path 352 is performed first.

Figure 5A:
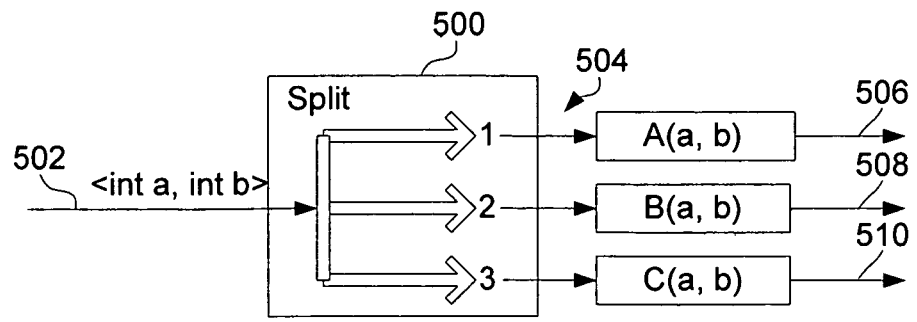
FIG. 5A is a schematic diagram of an operator for controlling order of execution of operations in an application for execution within a stream processing platform according to an embodiment of the invention.

FIG. 5A is a schematic diagram of an example of the "Split" operator 500 that may be used to control the order of execution of operations performed by the corresponding components in an application for execution within the stream processing platform according to an embodiment of the invention. Split operator 500 has one input port 502 and, in the embodiment illustrated, three output ports 504. The output ports are provided with an order, represented in the embodiment of FIG. 5A by the numbers 1, 2, and 3. In preparing machine-executable instructions for an application containing Split operator 500, stream compiler 400 will generate the instructions so that the downstream processing performed in operators in paths connected to the output ports in accordance with the order assigned to the ports.

FIG. 5A shows an example in which the Split operator receives an input data stream having values that are tuples containing two integers. The number of output ports corresponds to the number of downstream paths that will receive a copy of thin input data stream. Thus, Split operator 500 passes each tuple at its input for processing in three paths 506, 508, and 510. The sequence of operators performed by the components in these streams is controlled explicitly. Because path 506 is coupled to output port 1, when compiler 400 generates machine-executable instructions, those instructions performing processing in path 506 will be generated so that they are executed first. Path 508 is coupled to output port 2 and the instructions that execute processing in path 508 will be generated to execute after processing within path 506 is completed. Similarly, instructions that perform processing in path 510, because that port is coupled to port 3, will be generated to execute after processing in path 508 is completed.

Figure 5B:
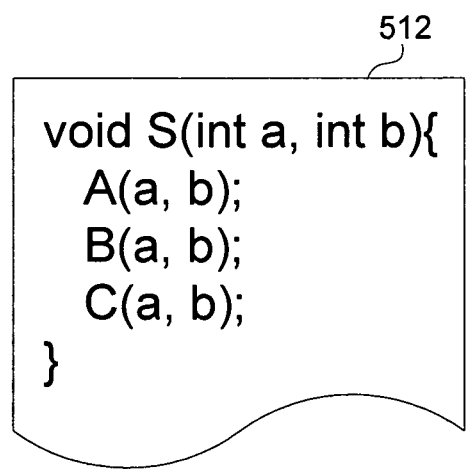
FIG. 5B is a schematic diagram of program code for the operator of FIG. 5A generated by a compiler operating according to an embodiment of the invention.

FIG. 5B is a schematic diagram of a source code representation of code that may be generated by a code generator for Split operator 500. In this example, functions A, B and C represent functions that perform processing in each of the paths 506, 508 and 510, respectively. As can be seen, the code 512 generated for Split operator 500 causes functions A, B and C to be executed to operate on a value applied to the input of Split operator 500 in the order in which paths 506, 508 and 510 are connected to the output ports.

In the embodiment illustrated, Split operator 500 passes an input value for processing in paths coupled to its output ports. However, in other embodiments, a processing function may be specified in connection with a split operator. In such embodiments, code 512 may contain additional statements, prior to functions calls to A, B and C performing functions defined for the Split operator.

Other constructs that may be implemented by a stream compiler according to embodiments of an invention may control execution of loops. A stream processing application may contain loops. The loops may also be explicitly defined by flow constructs specified in an application. Though, the loops may be implicit, i.e., generated by the compiler for feedback control or other system functions. In embodiments of the invention, a method of generating code such that a user can provide an indication that a sequence of operations can be performed in a loop of a certain type, and, consequently, stream compiler 400 may generate machine-executable instructions which realize the implementation of the loop in this indicated type.

Figure 6:
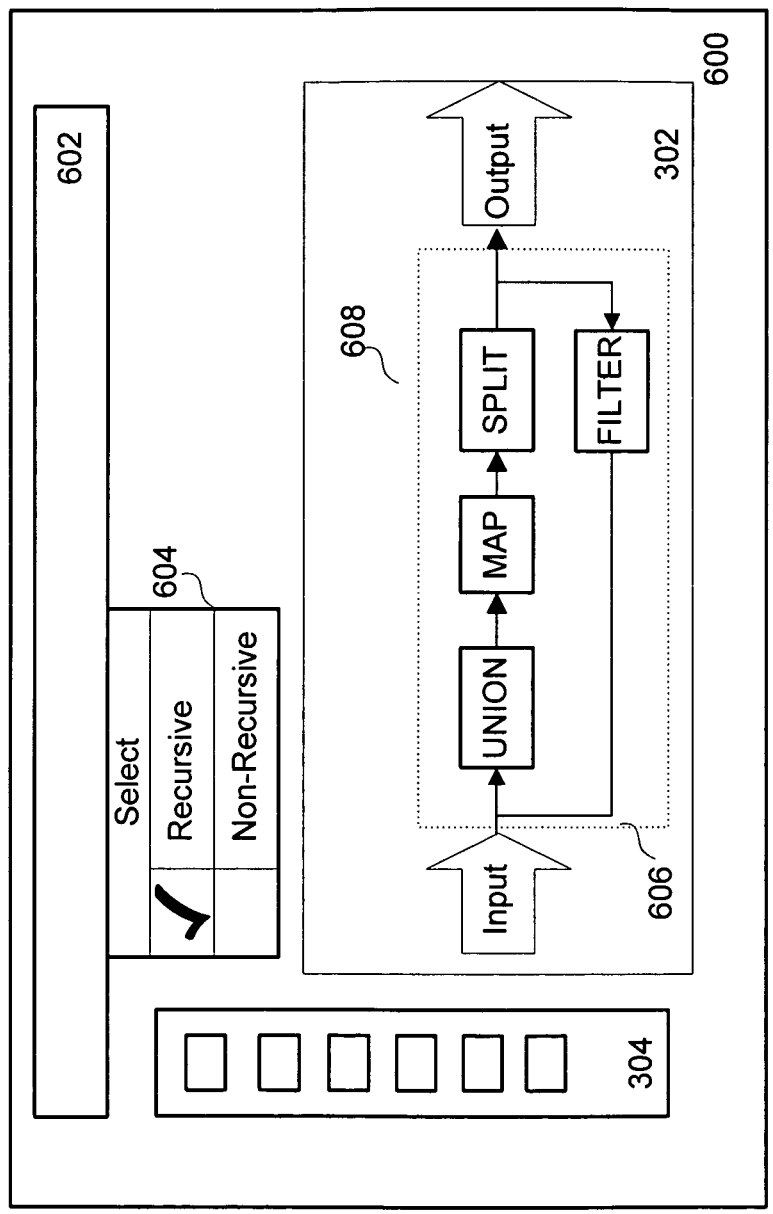
FIG. 6 is a sketch of a graphical user interface through which a user can indicate whether a compiler for a stream processing platform according to an embodiment of the invention generates program code to execute a loop recursively or non-recursively.

Accordingly, FIG. 6 shows a sketch of a graphical user interface 600 through which a user can define a stream processing application 608. In the embodiment illustrated, application 608 contains a loop 606. The user may specify a type associated with the loop and compiler 400 may generate machine-executable instructions to execute the loop using a type of processing as specified by the user.

In the illustrated embodiment, for loop 606, a user may specify that the loop is to be executed either recursively or non-recursively. Graphical user interface 600 is shown with drawing canvass 302 and palette 304, which may be in the same form as described above in connection with FIG. 3. In addition, graphical user interface 600 may contain a toolbar 602, which allows a user to specify an execution type of the loop. In this example, a drop-down menu 604 allows the user to check a box corresponding to the loop execution type of choice. The check-box is provided as an example only. Other methods of selecting a type of the loop execution can be used as well. Furthermore, one of the loop execution types may be a default type, while another may need to be specified explicitly. For example, a loop may be executed non-recursively unless a user specifies that the loop may be executed recursively. If a user may specify additional information to define execution parameters of the loop, that information may also be provided through a graphical user interface or in any suitable way. Though, in some embodiments, the execution type of a loop may also be selected automatically such as by processing that recognizes that a loop may be more efficiently executed as one type or another.

Compiler 400 uses user-specified information about a loop execution type to control generation of machine-executable instructions that implement the loop. For example, each iteration of a loop may be implemented by invoking one or more modules that implement operators within the loop. When the last operator of one iteration is completed, a module implementing the first operator in the loop may be called again. Execution may continue in this fashion until a loop exit condition, as specified as part of the stream processing application, is reached.

A platform for executing a stream application may supply a mechanism for allocating memory to store variables and manage other context information used during execution of a module. In an exemplary embodiment in which the stream processing application is executed on a JVM, a call stack provided by a JVM may be used for this purpose to establish a recursive loop. In such an implementation, each iteration of a loop may be executed as a call to the one or more modules implementing the loop. For each such call, a new "instance" of the module may be created. The JVM may allocate one or more stack frames storing context information used for execution of that instance. In this way, context information is readily preserved so that each iteration of the loop executes properly. Because features of the underlying platform, the call stack in this example, are used for execution, it is not necessary for the compiler to incorporate into the compiled code instructions that maintain context for each iteration of the loop.

However, memory consumed by allocation of multiple stack frames may be released only upon reaching the loop exit condition. Moreover, each stack frame stores context information for each iteration of the loop, even that information that does not change from iteration to iteration and may require a relatively large amount of memory. Therefore, executing the recursive loop a large number of times may result in a stack overflow before the exit condition is reached, if the memory allocated for the call stack by the JVM is consumed. Thus, recursive looping may not be desirable for loops that could execute a large number of times. But, for smaller loops, recursive loop execution may be relatively fast because use of the features of the underlying architecture avoid the need to execute code to initialize some other data structure to maintain context information for each iteration of the loop.

On the other hand, non-recursive looping may be implemented by establishing separate data structures to store context information that changes as iterations of the loop executes and information that does not change between iterations. The data structure that stores that stores information that changes from one iteration to the next may be stored in a dynamic data structure, but the other information may be stored in a data structure allocated before execution of the loop.

In the embodiment illustrated, non-recursive looping may involve enqueuing data or other context information that changes as the loop executes. Non-recursive execution may involve creation of one or more queues. Though the compiler may generate code that establishes these queues at the outset of a loop, execution of a non-recursive loop may be quicker than recursive execution because the average time required to access information may be less than if comparable information were stored on a call stack. For larger loops, the reduction in the execution time of each iteration may offset the time required to initialize the data structures, resulting in less total execution time. As an additional benefit, because only subset of context information, that which changes from iteration to iteration, may be stored at each iteration, the total memory required to execute a non-recursive loop may be less.

In some embodiments implementing non-recursive looping, generating machine-executable instructions to implement a loop non-recursively may entail a requirement that a priori information about the number of iterations of a loop that will be performed or other information from which the size of the queues needed to execute the loop be ascertained. Such information may be obtained in any suitable way, such as being specified by a user or by automated analysis of a stream processing application. However, in the illustrated embodiment, the queue length is dynamic, in which case a priori knowledge of the number of iterations is not required. In embodiments of the invention, a default type of loop execution is non-recursive using a dynamic queue, i.e. the queue of a dynamic length.

Figures 7A, 7B:
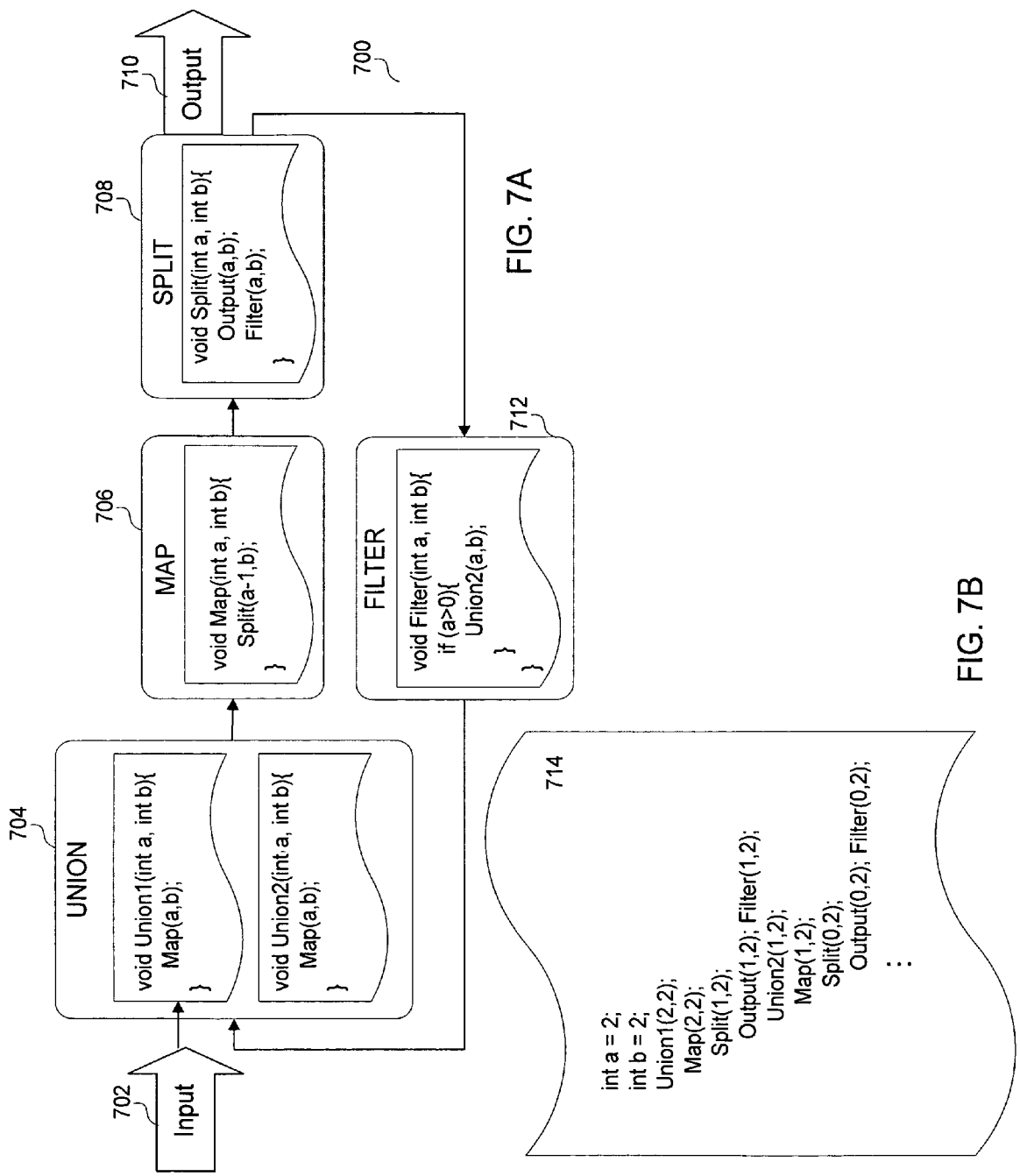
FIG. 7A is an event flow diagram of a loop executed recursively in a stream processing platform according to an embodiment of the invention.
FIG. 7B is a schematic diagram of an execution sequence of the events in the event flow diagram of FIG. 6A.

Accordingly, FIG. 7A is an event flow diagram of a loop executed recursively and illustrates machine-executable instructions that may be generated for loop 606 that may be generated when recursive execution of the loop has been selected. Operators 704, 706, 708 and 712 are part of an exemplary application diagram 700. In this example, "Split" operator 708 has two output ports and passes a tuple obtained from an input 702, first, to an output 710 and, second, to the "Filter" operator 712. "Union" operator 704 has two input ports, one of which receives a tuple from the input 702 and another receives a tuple from the output of "Filter" operator 712. A code generator associated with "Union" operator 704 may generate a corresponding method for each input port of operator 704, which are denoted as Union1 and Union2.

The operators 706, 708 and 712 may likewise have code generators that provide corresponding methods. In the embodiment illustrated, Map operator 706 implements a function that subtracts 1 from the value of the "a" element of each input value inputted to it. Filter operator 712 implements a function that outputs a data value in response to an input value if the "a" element of the data value is greater than 0.

FIG. 7B is a schematic diagram 714 of an execution sequence that occurs from execution of the loop shown in the event flow diagram of FIG. 7A. FIG. 7B shows that, given an exemplary input tuple having a value of <a=2, b=2>, the operators in the forward portion of loop 700 would be executed once, producing an output value of <a=1, b=2>.

This same value would pass through filter operator 712, and would then be fed back through the second input port of Union operator 704. A second iteration of the loop would be performed, at which an output of <a=0, b=2> would be computed in Map operator 706. This value would be outputted, but would not pass through Filter operator 712 and no further iterations of loop 700 would be performed.

Figure 8:
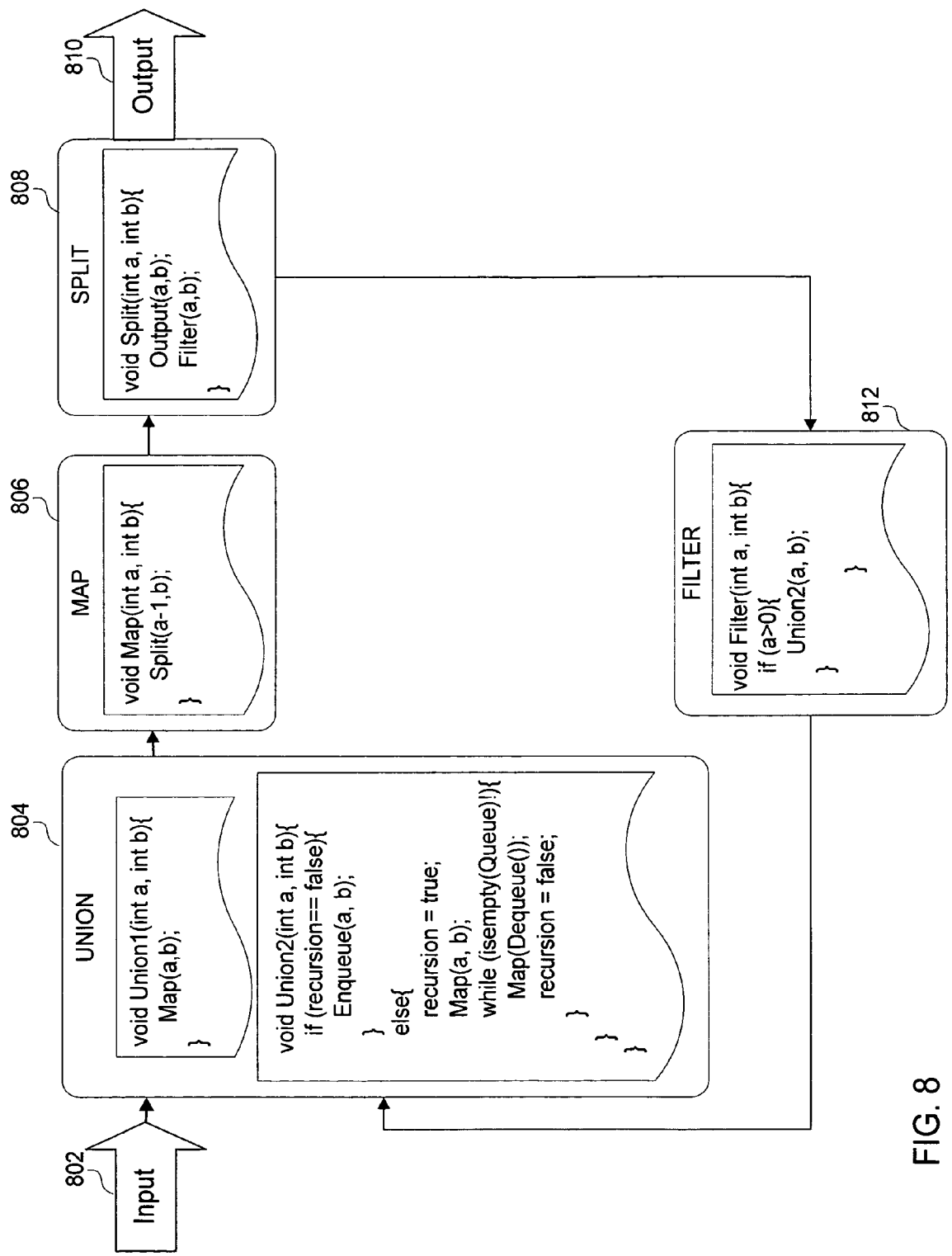
FIG. 8 is an example of an event flow diagram of a loop executed non-recursively in a stream processing platform according to an embodiment of the invention.

Alternatively, machine-executable instructions may be generated that non-recursively encode instructions for loop 700. FIG. 8 is an example of an event flow diagram of loop 700 executed non-recursively in a stream processing platform according to some embodiments of the present invention. As can be seen from comparison of FIGS. 7A and 8, code generators for the Map, Split and Filter operators may generate machine-executable instructions for operators 806, 808, and 812, whether recursive or non-recursive execution is implemented.

Code generated for Union operator 804 may differ in FIG. 8 to reflect non-recursive execution. In this example, compiler 400 implements a method Union2 that, if the non-recursive execution is chosen, places tuples to be executed by the Map operator 804 on a queue. That queue is accessed within a loop encoded within the machine-executable instructions corresponding to Union2. As long as there are tuples in the queue to deque, the loop will be executed, where the size of the queue may be either specified in advance or grow dynamically so long as memory is available. Such an approach may be more efficient than dynamically allocating storage using a stack construct or may lead to more efficient execution of a loop.

In embodiments of the invention, the stream compiler may generate machine-executable instructions to execute some portions of an application in parallel. In this context, parallel execution of portions may be achieved by separating those portions for execution by a boundary in any suitable way. For example, those portions may be configured for execution in separate threads, processors or machines. The portions may also be configured for execution as a single process executed within a single thread or multiple threads, or as multiple processes each executed within at least one thread. The specific implementation of parallel execution may depend on the hardware configuration of the execution environment. For example, threads may be distributed automatically at run time across multiple processors on single computing device or across multiple computing devices which may be in a cluster. Though any suitable mechanism may be used to select specific resources for execution of threads. Parallel execution need not result in simultaneous execution. In a machine that has a single processor, parallel execution may entail execution in separate threads, even if one thread is active at a time.

Figure 9:
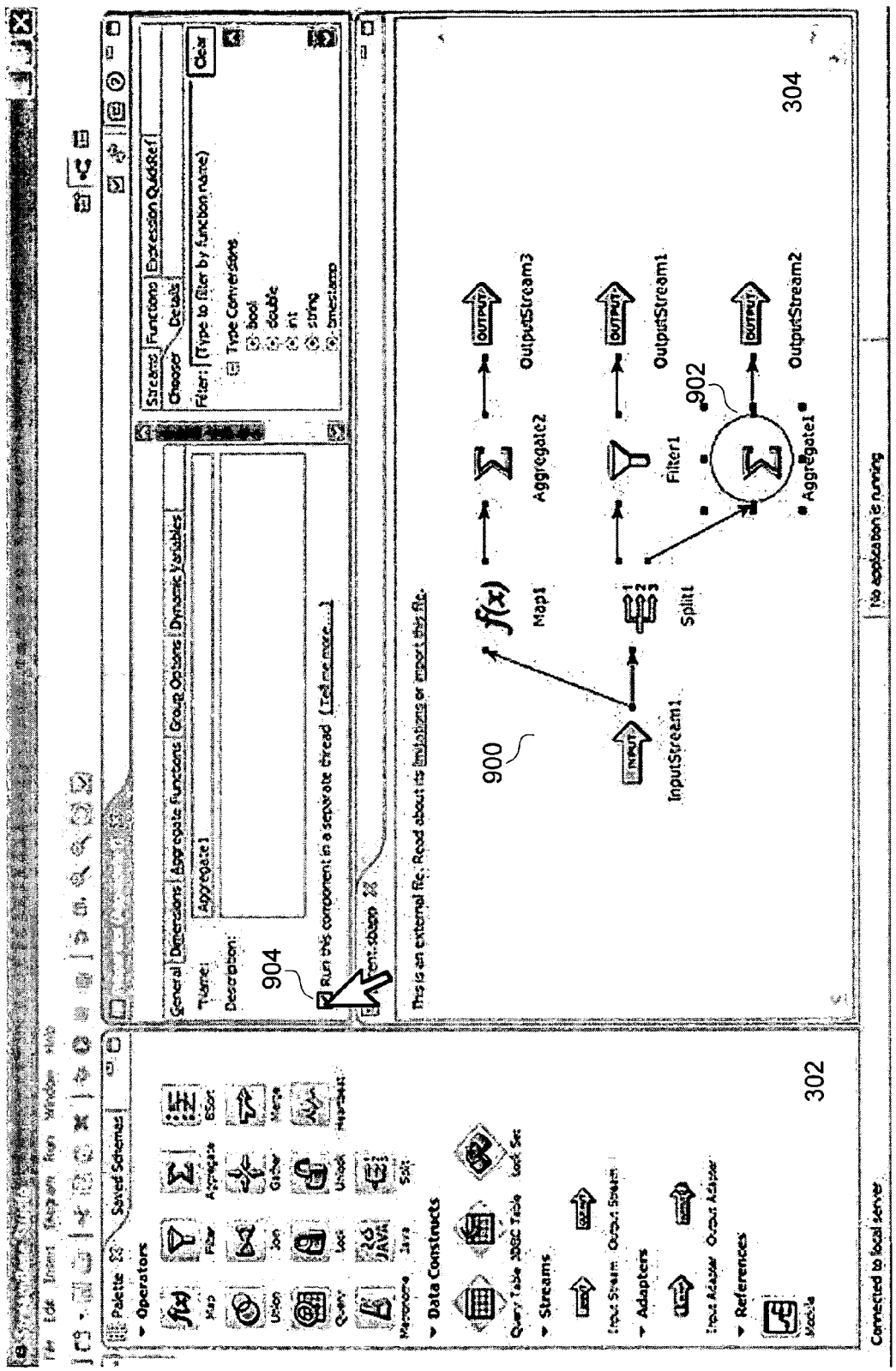
FIG. 9 is a sketch of a graphical user interface of a stream processing platform through which a user can indicate whether a compiler for a stream processing platform according to an embodiment of the invention generates program code to execute an operation in parallel with other operations.

FIG. 9 is a sketch of a graphical user interface of a stream processing platform through which a user can indicate whether a portion of an application is to be executed in parallel with other portions of the application. In the embodiment illustrated, a component specifying an operator may be selected for execution in a separate thread. The graphical user interface through which a user may specify a stream processing application includes a control, here shown as check-box 904, that can be used to specify a component for separate execution.

In response to this specification, a stream compiler may generate machine-executable instructions for the application diagram 900 such that a component, such as Aggregate1 component 902 shown in FIG. 9, is executed in parallel with other components of the application. In this example, parallel execution is enabled by running machine-executable instructions implementing the functionality of component 902 in a separate thread. This option is well suited for components that can run without data dependencies on other components in the application.

In embodiments in which a stream processing platform is implemented on a run-time platform that implements multi-threading, parallel operation may be achieved by encoding the components to take advantage of the multi-threading capability of the runtime platform. However, any suitable mechanism may be used to generate machine-executable instructions in a separate thread or otherwise separated by a boundary.

Any suitable number or type of components may be selected for parallel execution. In the embodiment illustrated, a single operator is selected for execution in a separate thread. However, in some embodiments, combinations of operators or other components of a stream processing application may be specified for execution in a separate thread.

Figure 10:
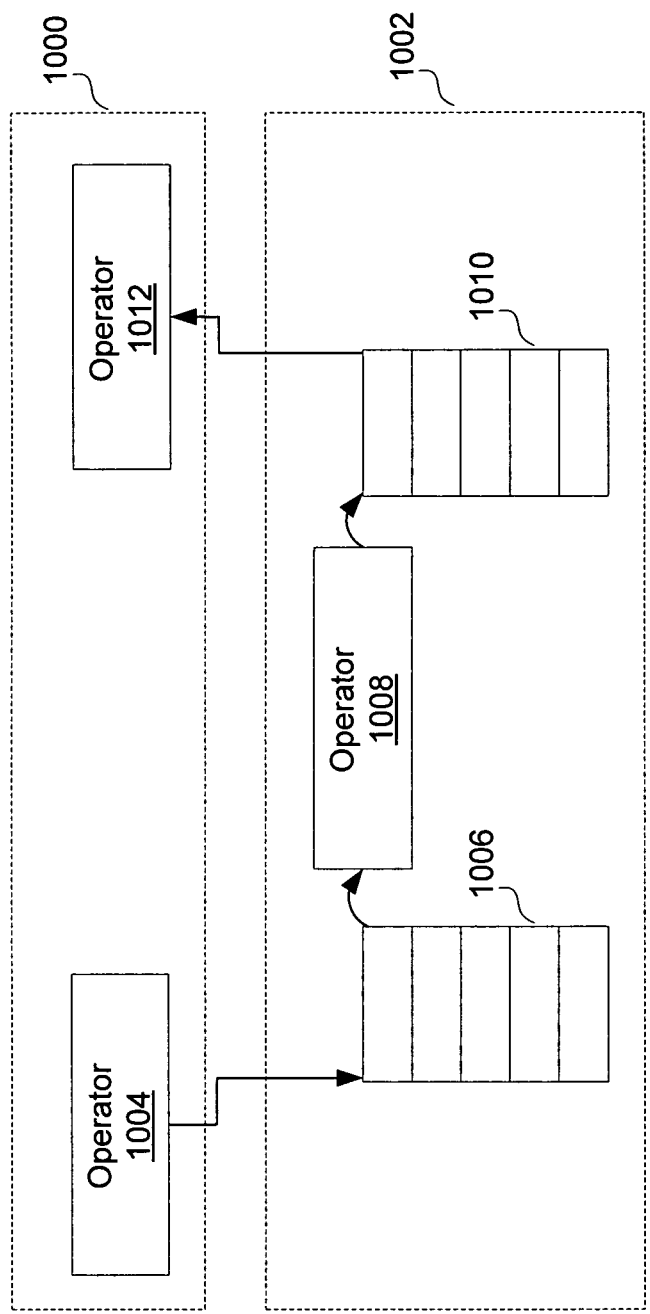
FIG. 10 is a schematic diagram of program code generated to execute operations in parallel according to an embodiment of the invention.

FIG. 10 is a schematic diagram of program code of machine-executable instructions that may be generated to execute components in parallel according to an embodiment of the invention. FIG. 10 shows threads 1000 and 1002 which contain machine-executable instructions for operators 1004, 1008, and 1012, respectively. In the example pictured, operator 1008 has been marked for execution in a separate thread. Accordingly, operator 1008 is indicated in thread 1002 while operators 1004 and 1012 are running in the thread 1000.

Operator 1004 passes tuples to the operator 1008, which in turn sends tuples to the operator 1012. To pass data between operators in different threads, queues may be used. As FIG. 10 shows, module 1008 has an input queue 1006 and an output queue 1010. Arriving tuples are queued at the queue 1006, processed by module 1008 and queued at the output queue 1010. In this way, operator 1004 may generate data for operator 1008 at times when operator 1008 is not ready to process it. When operator 1008 is able to process more data, it may read data from queue 1006. Likewise, operator 1008 may generate data when operator 1012 is not ready to process it. Such data may be stored in queue 1010 until operator 1012 is ready to process it.

The specific number and position of queues is not a limitation of the invention. For example, queue 1006 could be in thread 1000 at the output of operator 1004 or queue 1010 could be in thread 1000 at the input of operator 1012. Also, other data structures may be used to provide data between threads or otherwise across boundaries between operators.

Other attributes of a stream processing platform may be tailored to process large amounts of data, much of which may be a complex type that a stream processing engine may be required to process. As another example, a stream compiler may specify machine-executable instructions so that a variable of any type is implemented as a set of primitive types. Though, such an approach may be desirable in safe runtime environment in which storage for complex objects is allocated using headers and require other processing overhead.

Figure 11:
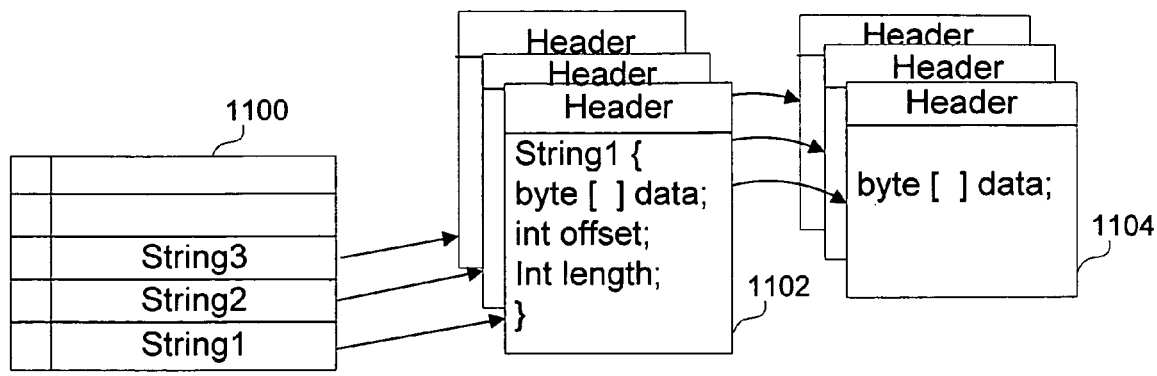
FIG. 11 is a schematic diagram of a prior art representation of a complex data type.

FIG. 11 is a schematic diagram of a prior art representation of allocation of storage for a complex data type. In JAVA®, for example, complex data types include arrays, strings, and objects. A JVM provides a heap-based memory allocation. Each string variable shown in 1100 is an instance of the JAVA® String class. For each declared string variable, a new String object is constructed by decoding a specified byte array using a default charset of a JVM, as shown in 1102. The object contains an object header, which consists of a pointer to a virtual function table (not shown), followed by instance fields of the class. Thus, the instance field of the String object in 1102 contains three parameters. A "byte[ ]" parameter is an array of bytes to be decoded into characters. An "offset" is the index of the first byte to decode and the "length" is the number of bytes to decode. For the "byte[ ]" array of bytes, a separate object 1102 needs to be constructed, which contains the actual bytes to be decoded into characters. Therefore, in standard JAVA® implementation, two objects are created for each string. This leads to additional memory allocation, which may slow down the processing speed and require large amounts of memory to process a stream, particularly in the situation when there are large number of strings, which is, naturally, the case in stream processing.

Figure 12:
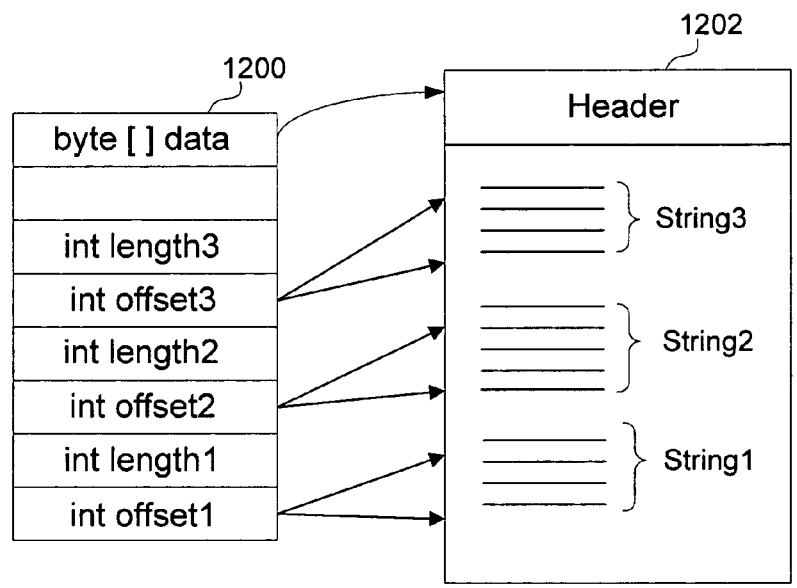
FIG. 12 is a schematic diagram of a representation of a complex data type according to embodiments of the invention.

To reduce the number of headers generated for each complex object, in embodiments of the invention, complex data types are collected into a single object. FIG. 12 is a schematic diagram of such a representation of objects of a complex data type. FIG. 12 indicates an alternative memory allocation that may result if a stream compiler specifies string objects, as in FIG. 11, as a collection of objects that have primitive data types rather than as a single object of a complex type. The data structures pictured in FIG. 12 may be encapsulated within a data class generated by a stream compiler or in any other suitable way. The complex type data representation implemented in embodiments of the invention allows efficient implementation of parallel queues, stacks or other data structures.

In the scenario illustrated, objects may be explicitly allocated on a stack or other suitable data structure. However, the allocation may result in storage of values for variables of primitive type that serve as references to locations where values of the complex objects are stored. In the example illustrated, storage of the data for objects of a complex type may be allocated within a data structure in a heap or other suitable storage location. The same data structure may be used to provide storage locations for multiple objects of a complex type. But, because only one storage object is allocated, the total number of headers created may be reduced.

In the specific example of FIG. 12, storage is allocated on heap 1202 by declaring an object, which may be a byte array. This byte array may be used to store values associated with three string variables. The storage locations on stack 1200 represent each string that stores a value of an offset in the byte array that is the start of the storage location for the string and the length of that string. Thus, the total amount of storage used to represent three strings, and the processing overhead imposed by a safe runtime environment to create storage for those complex variables, is less than illustrated in connection with FIG. 11. Nonetheless, advantages of a safe runtime are obtained.

Storage for any number or type of complex variables may be allocated in this fashion. Moreover, any number of data structures may be allocated in a heap, or other suitable memory structure, for holding data associated with variables of a complex data type.

Though the representation of complex types is illustrated in connection with the handling of a string by a stream compiler, the invention is not limited to use in a stream compiler or use in conjunction with a string. Any complex data type may be represented as a collection of primitives. Such a representation may be used for interpreted stream processing applications or stream processing applications implemented in any suitable way.

Figure 13:
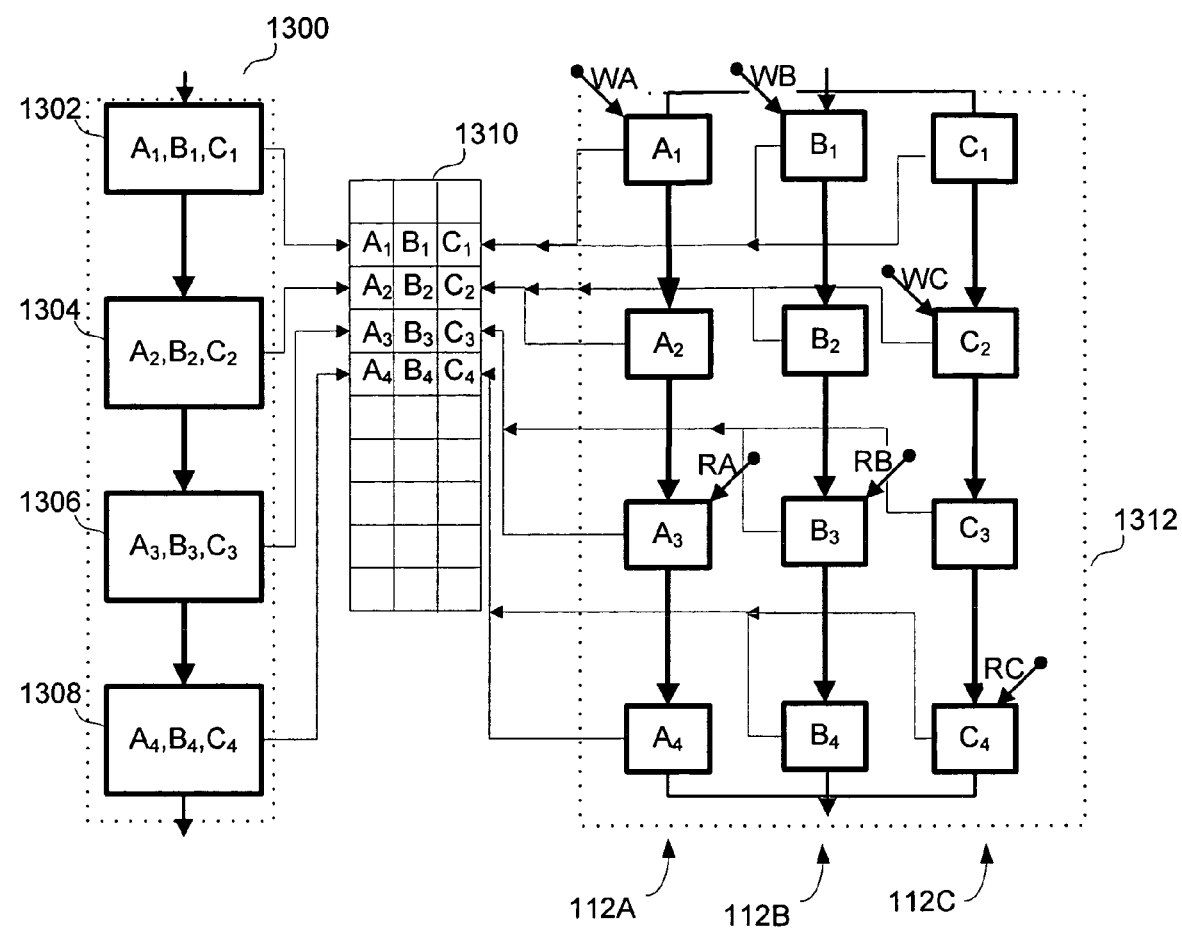
FIG. 13 is a schematic diagram illustrating implementation of a queue holding data values having multiple elements according to an embodiment of the invention.

Queuing may be carried out using a method referred to as parallel queuing to pass tuples. Parallel queues may provide more efficient data storage compared to conventional heap memory allocation. FIG. 13 is a schematic diagram illustrating implementation of a parallel queue. Such a queue may be used, for example, between operators in modules separated by a thread boundary as illustrated in FIG. 10, or in any other situation.

In FIG. 13, a stream 1300 of data values may be generated in one thread and stored in a queue 1312 accessed by operators or other modules in a separate thread. Thus, tuples 1302-1308 passed by several modules generated within one thread, are queued in a queue 1312 for processing in a separate thread. Traditionally, in a thread-safe queue implementation in which modules executing in parallel may access the same data structure, the data structure is "locked" to one thread so that data within the data structure is not modified by one thread while a module within another thread is accessing that data. Locking a data structure in this fashion in a stream processing application can significantly slow execution of a stream processing application because of the number of times that a data structure may be accessed as data in a stream is processed.

In an embodiment of the invention, a thread-safe queue implementation may be provided that is more suitable for stream processing. To reduce the amount of time that processing in a thread is blocked because a data structure is locked, a queue receiving data values represented as a tuple may be implemented as multiple parallel queues. Each of the parallel queues may receive values associated with one or more elements of a data value. Each of the parallel queues may operate independently.

Parallel queues may also be implemented to allow efficient data storage using a memory allocation approach as illustrated in FIG. 12. Rather than creating a data structure to store each tuple, the elements of each tuple may be separately stored as contiguous sequences of primitive values in parallel arrays. A parallel array may be implemented as a simple data structure formed by allocation contiguous locations in a byte array or other data structure.

Though it is not necessary that each element of a data value be stored in a separate parallel queue, FIG. 13 illustrates that queue 1312 may be implemented as three parallel queues 1312A, 1312B and 1312C, each receiving data for one element of each of the data values in stream 1300.

Each parallel queue 1312A, 1312B and 1312C has a separate write pointer (WA, WB and WC) and separate read pointer (RA, RB and RC). Though each parallel queue 1312A, 1312B and 1312C may be locked when accessed by a thread, the amount of time each queue is locked is less than if an entire data value were stored in a queue. Because each location in a parallel queue stores less data than if the entire data value were stored in a conventional queue, the amount of time required to access the queue is reduced.

FIG. 13, also illustrates a further mechanism to reduce processing delays associated with queue access times. Queue access time may be further reduced by passing pointers to data elements rather than copies of the data values. In the embodiment illustrated, as data values from stream 1300 are generated and available to be passed to queue 1312, those values are stored in a data structure 1310. Pointers to elements of the stored data values are passed to parallel queues 1312A, 1312B and 1312C.

Data structure 1310 may be implemented in any suitable way. As one example, a known memory management technique may be used, for example, to allocate storage on a heap for data structure 1310. However, any available storage may be used to implement data structure 1310.

Figures 14A, 14B:
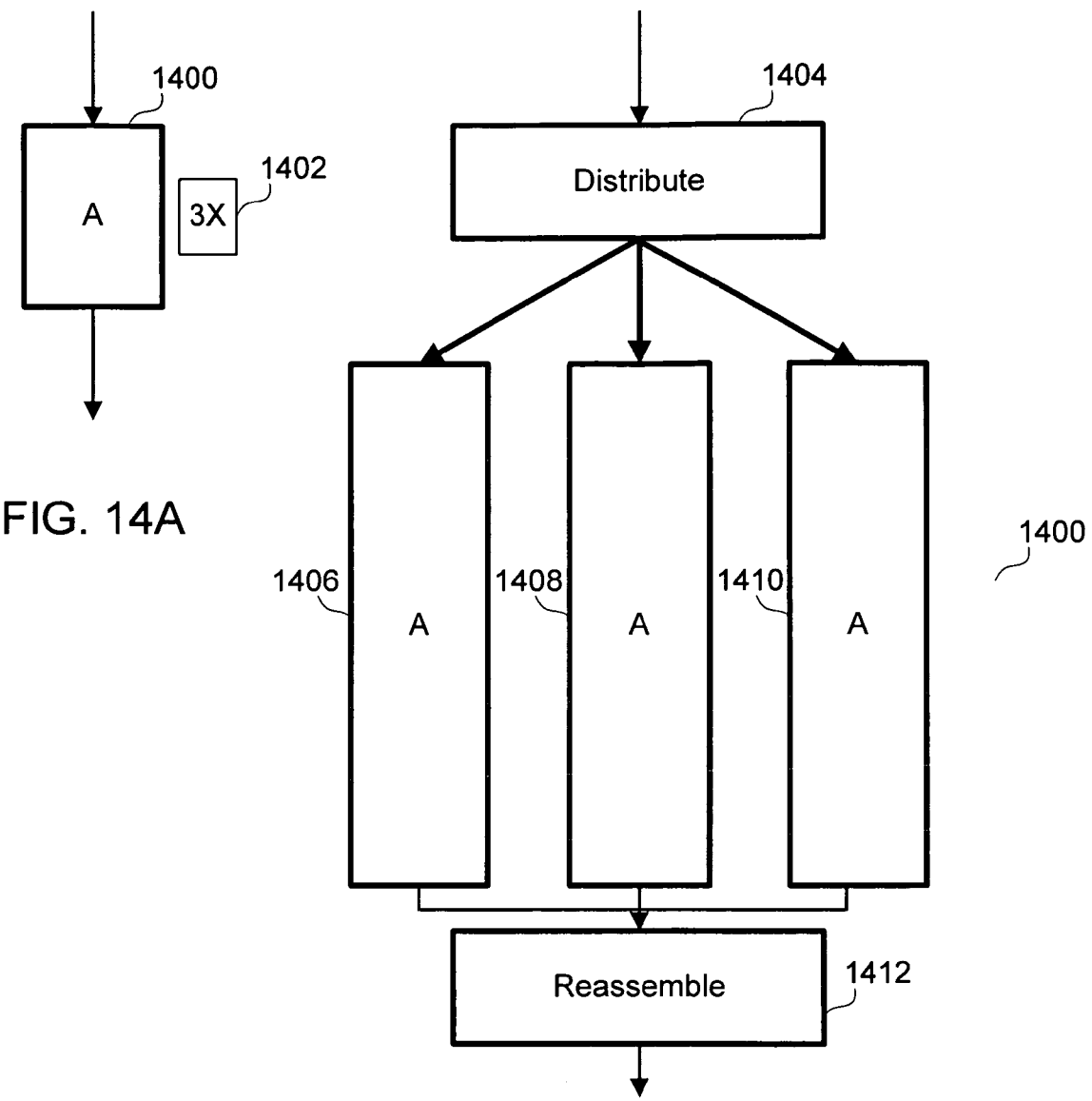
FIG. 14A is a sketch of a graphical user interface of a stream processing platform according to an embodiment of the invention through which a user can indicate that a stream of data is to be processed in multiple parallel instances of program code executing an operation.
FIG. 14B is a schematic diagram of program code generated in response to user input of FIG. 14A by a compiler operating according to an embodiment of the invention.

A compiler according to an embodiment of the invention may accept user input that specifies other attributes of the machine-executable instructions generated for a stream processing application. FIG. 14A is a sketch of a graphical user interface of a stream processing platform according to an embodiment of the invention through which a user can indicate that a stream of data is to be processed in multiple parallel instances of some portion of the stream processing application. In the illustrated embodiment, an operator A is specified for multiple parallel instances. A user interface may provide any suitable mechanism for a user to specify parallel instances. In this example, parallel instances are specified in an input data field adjacent to an icon for an operator, here pictured as operator A.

FIG. 14B is a schematic diagram of machine-executable modules generated in response to user input of FIG. 14A by the stream compiler operating according to an embodiment of the invention. Thus, if the user specifies that the operator A may be executed in three parallel instances, the compiler may generate machine-executable instructions to create parallel instances 1406, 1408 and 1410.

These parallel instances may be preceded by module 1404 that distributes data values in an input stream to module A to one of the parallel instances 1406, 1408 and 1410. Module 1404 may distribute successive values in a stream to the parallel instances in a "round-robin" fashion or in any other suitable way. The parallel instances may be followed by a module 1412 that gathers output from the parallel instances and reassembles them into an output data stream resulting from processing in module A.

As one example of the use of data parallelism as indicated in FIGS. 14A and 14B, an operator that requires a substantial amount of processing resources and may otherwise be a bottleneck in execution of a stream processing application may be indicated for parallel execution. In embodiments in which parallel instances of an operator are configured for execution in separate threads, the parallel instances are likely to receive more processing cycles for processing a stream than if implemented as a single instance. This allocation of processing resources may be most significant if separate computing resources are available for execution of the threads containing the parallel instances of an operator, though a comparable effect may be achieved in which multiple threads are used as away to allocate resources of a single processor.

Though this approach of implementing a parallel instances of an operator or other component of a stream processing application is described in conjunction with a compiler, its use is not so limited. For example, it may be applied in an interpreted stream processing platform as in the prior art or in any other suitable context.

Having thus described several aspects of at least one embodiment of this invention, it is to be appreciated that various alterations, modifications, and improvements will readily occur to those skilled in the art.

For example, stream processing server 208 and IDE 204 can be located on the same computing device or on different computing devices coupled via a communication link.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of generating machine-executable instructions for processing a stream of values, the method comprising:
generating machine-executable instructions to be executed in processing inputs of at least one input stream to generate outputs of at least one output stream, the machine-executable instructions defining at least one data path and each data path comprising at least one operation, wherein generating the machine-executable instructions comprises generating the instructions such that executing the machine-executable instructions to process each input of the at least one input stream comprises executing operations of the at least one data path in a same deterministic order for each input, the deterministic order incorporating each of the operations of the at least one data path, and wherein generating the machine-executable instructions comprises:
receiving a representation of processing to be performed on the at least one input stream to produce the at least one output stream, the representation including a plurality of operators and a data flow, wherein at least some of the plurality of operators are arranged in the data flow in at least one loop, wherein the data flow includes the at least one data path and the plurality of operators correspond to the operations of the at least one data path that are to be executed in the deterministic order for each input of the at least one input stream;
receiving a user input indicating at least one implementation type, corresponding to each of the at least one loop, that is to be used in compiling instructions for each of the at least one loop and in determining the deterministic order in which the plurality of operators, including operators of the at least one loop, will be executed for each input of the at least one input stream; and
compiling the representation into the machine-executable instructions, the compiling comprising at least (i) forming an intermediate representation of the plurality of operators, the data flow including the plurality of operators, and the at least one loop each having the corresponding implementation type indicated by the user input, (ii) forming an executable code model for stream processing based on the intermediate representation, and (iii) forming the machine-executable instructions based on the executable code model, wherein the executable code model defines the deterministic order in which the operations of the data flow will be executed for each input of the at least one input stream and forming the machine-executable instructions based on the executable code model comprises generating a sequence of instructions corresponding to the operations of one of the at least one data path, wherein the sequence specifies an order of execution of instructions of the sequence that matches the same deterministic order such that execution of the machine-executable instructions for each input of the at least one input data stream comprises executing the sequence of instructions corresponding to the operations in the same deterministic order, and wherein the sequence of instructions defines instructions for recursively executing instructions corresponding to operators of a loop of the at least one loop when a corresponding implementation type of the loop is a first type and defines instructions for non-recursively executing instructions corresponding to operators of a loop of the at least one loop when a corresponding implementation type of the loop is a second type.

2. The method of claim 1, wherein receiving a representation comprises receiving the representation through a graphical user interface.

3. The method of claim 1, wherein compiling the representation comprises:
generating a set of ordered statements in a source code for a computer programming language;
generating an executable representation of the ordered statements.

4. The method of claim 3, wherein:
generating a set of ordered statements comprises generating a JAVA program; and
generating an executable representation comprises compiling the set of ordered statements in a JAVA compiler.

5. The method of claim 1, wherein compiling the representation into machine-executable instructions comprises:
compiling the representation into machine-executable instructions that, in response to application of the input of an input data stream, perform the operations on the input of the input data stream in the same deterministic order, the operations producing a value of an output stream of the at least one output stream.

6. The method of claim 1, wherein compiling the representation into machine-executable instructions comprises operating a plurality of code generators, each code generator associated with an operator of the plurality of operators.

7. The method of claim 1, wherein the first type of loop is a recursive type and the second type of loop is a non-recursive type.

8. The method of claim 7, wherein each of the at least one loop is one of the recursive type or the non-recursive type.

9. At least one non-transitory computer-readable storage medium having encoded thereon executable instructions that, when executed by at least one processor, cause the at least one processor to carry out a method of generating machine-executable instructions for processing a stream of values, the method comprising:
generating machine-executable instructions to be executed in processing inputs of at least one input stream to generate outputs of at least one output stream, the machine-executable instructions defining at least one data path and each data path comprising at least one operation, wherein generating the machine-executable instructions comprises generating the instructions such that executing the machine-executable instructions to process each input of the at least one input stream comprises executing operations of the at least one data path in a same deterministic order for each input, the deterministic order incorporating each of the operations of the at least one data path, and wherein generating the machine-executable instructions comprises:
receiving a representation of processing to be performed on the at least one input stream to produce the at least one output stream, the representation including a plurality of operators and a data flow, wherein at least some of the plurality of operators are arranged in the data flow in at least one loop, wherein the data flow includes the at least one data path and the plurality of operators correspond to the operations of the at least one data path that are to be executed in the deterministic order for each input of the at least one input stream;
receiving a user input indicating at least one implementation type, corresponding to each of the at least one loop, that is to be used in compiling instructions for each of the at least one loop and in determining the deterministic order in which the plurality of operators, including operators of the at least one loop, will be executed for each input of the at least one input stream, wherein each implementation type of the at least one implementation type is a recursive type or a non-recursive type; and compiling the representation into the machine-executable instructions, the compiling comprising at least (i) forming an intermediate representation of the plurality of operators, the data flow including the plurality of operators, and the at least one loop each having the corresponding implementation type indicated by the user input, (ii) forming an executable code model for stream processing based on the intermediate representation, and (iii) forming the machine-executable instructions based on the executable code model, wherein the executable code model defines the deterministic order in which the operations of the data flow will be executed for each input of the at least one input stream and forming the machine-executable instructions based on the executable code model comprises generating a sequence of instructions corresponding to the operations of one of the at least one data path, wherein the sequence specifies an order of execution of instructions of the sequence that matches the same deterministic order such that execution of the machine-executable instructions for each input of the at least one input data stream comprises executing the sequence of instructions corresponding to the operations in the same deterministic order, and wherein the sequence of instructions defines instructions for recursively executing instructions corresponding to operators of a loop of the at least one loop when a corresponding implementation type of the loop is a recursive type and defines instructions for non-recursively executing instructions corresponding to operators of a loop of the at least one loop when a corresponding implementation type of the loop is a non-recursive type.

10. An apparatus comprising:

at least one processor; and at least one computer-readable storage medium having encoded thereon executable instructions that, when executed by at least one processor, cause the at least one processor to carry out a method of generating machine-executable instructions for processing a stream of values, the method comprising:

generating machine-executable instructions to be executed in processing inputs of at least one input stream to generate outputs of at least one output stream, the machine-executable instructions defining at least one data path and each data path comprising at least one operation, wherein generating the machine-executable instructions comprises generating the instructions such that executing the machine-executable instructions to process each input of the at least one input stream comprises executing operations of the at least one data path in a same deterministic order for each input, the deterministic order incorporating each of the operations of the at least one data path, and wherein generating the machine-executable instructions comprises:

receiving a representation of processing to be performed on the at least one input stream to produce the at least one output stream, the representation including a plurality of operators and a data flow, wherein at least some of the plurality of operators are arranged in the data flow in at least one loop, wherein the data flow includes the at least one data path and the plurality of operators correspond to the operations of the at least one data path that are to be executed in the deterministic order for each input of the at least one input stream;

receiving a user input indicating at least one implementation type, corresponding to each of the at least one loop, that is to be used in compiling instructions for each of the at least one loop and in determining the deterministic order in which the plurality of operators, including operators of the at least one loop, will be executed for each input of the at least one input stream, wherein each implementation type of the at least one implementation type is a recursive type or a non-recursive type; and compiling the representation into the machine-executable instructions, the compiling comprising at least (i) forming an intermediate representation of the plurality of operators, the data flow including the plurality of operators, and the at least one loop each having the corresponding implementation type indicated by the user input, (ii) forming an executable code model for stream processing based on the intermediate representation, and (iii) forming the machine-executable instructions based on the executable code model, wherein the executable code model defines the deterministic order in which the operations of the data flow will be executed for each input of the at least one input stream and forming the machine-executable instructions based on the executable code model comprises generating a sequence of instructions corresponding to the operations of one of the at least one data path, wherein the sequence specifies an order of execution of instructions of the sequence that matches the same deterministic order such that execution of the machine-executable instructions for each input of the at least one input data stream comprises executing the sequence of instructions corresponding to the operations in the same deterministic order, and wherein the sequence of instructions defines instructions for recursively executing instructions corresponding to operators of a loop of the at least one loop when a corresponding implementation type of the loop is a recursive type and defines instructions for non-recursively executing instructions corresponding to operators of a loop of the at least one loop when a corresponding implementation type of the loop is a non-recursive type.

* * * * *